United States Patent
Liao et al.

(10) Patent No.: US 7,934,879 B2
(45) Date of Patent: May 3, 2011

(54) CAMERA MODULE, FABRICATING METHOD AND CLEANING METHOD THEREOF

(75) Inventors: Hsiang-Kai Liao, Taipei (TW); Po-Chun Chang, Guangzhou (CN)

(73) Assignee: Primax Electronics Ltd., Taipei (TW)

( * ) Notice: Subject to any disclaimer, the term of this patent is extended or adjusted under 35 U.S.C. 154(b) by 224 days.

(21) Appl. No.: 12/466,203

(22) Filed: May 14, 2009

(65) Prior Publication Data

US 2010/0224216 A1  Sep. 9, 2010

(30) Foreign Application Priority Data

Mar. 6, 2009 (TW) ................................ 98107286 A

(51) Int. Cl.
*G03B 17/00* (2006.01)
*B08B 9/00* (2006.01)
*G01R 35/00* (2006.01)
(52) U.S. Cl. .............................. 396/529; 134/21; 29/593
(58) Field of Classification Search .................. 396/529; 134/21; 29/593
See application file for complete search history.

(56) References Cited

U.S. PATENT DOCUMENTS

| 7,567,754 | B2 * | 7/2009 | Kinoshita | 396/89 |
| 2004/0244192 | A1 * | 12/2004 | Hsin et al. | 29/854 |
| 2005/0081891 | A1 * | 4/2005 | Arjomand | 134/21 |
| 2006/0280499 | A1 * | 12/2006 | Lee et al. | 396/529 |
| 2010/0170082 | A1 * | 7/2010 | Lo | 29/593 |

* cited by examiner

*Primary Examiner* — W. B. Perkey
(74) *Attorney, Agent, or Firm* — Kirton & McConkie; Evan R. Witt

(57) ABSTRACT

A camera module includes a lens module, an image sensor, a circuit board for supporting the image sensor, and a lens holder for connecting the lens module and the circuit board. A method for fabricating the camera module includes the following steps. Firstly, at least one cleaning hole is created in the lens holder, and the at least one cleaning hole is filled with a removable sealing stuff. Then, the printed circuit board, the image sensor, the lens holder and the lens module of the camera module are combined together. Then, a testing procedure is performed to detect whether any pollutant is present within the assembled camera module. Once any pollutant within the assembled camera module is detected, the sealing stuff is removed from the at least one cleaning hole, a cleaning procedure is done to remove the pollutant, and the at least one cleaning hole is sealed again.

30 Claims, 4 Drawing Sheets

CAMERA MODULE, FABRICATING METHOD AND CLEANING METHOD THEREOF

FIELD OF THE INVENTION

The present invention relates to a camera module, a fabricating method of the camera module, and a cleaning method of the camera module, and more particularly to a camera module, a fabricating method of the camera module, and a cleaning method of the camera module in order for reducing the damage rate, reducing the fabricating cost and increasing the throughput.

BACKGROUND OF THE INVENTION

Nowadays, personal communication devices have experienced great growth and are now rapidly gaining in popularity. The personal communication devices having image capturing devices are gradually marketable. The common image capturing devices are for example camera modules or video camera modules. When the image capturing devices are used in mobile phones, personal digital assistant (PDA) or notebook computers for video recording, video calling, video conferencing or other network applications, the convenience and the diversity of these image capturing devices are evident. Generally, such an image capturing device principally comprises a lens module, a lens holder, an image sensor and a printed circuit board (PCB). An example of the image sensor includes a CCD (charge coupled device) chip or a CMOS (complementary metal-oxide semiconductor) chip.

Conventionally, there are several methods of assembling the camera module. In accordance with a first assembling method, the image sensor is firstly fixed on the printed circuit board, a filter and a lens module are then combined with a lens holder, and the lens holder is finally glued on the printed circuit board. As such, a close space is defined by the printed circuit board, the lens holder and the filter. During the process of producing, transporting or assembling the camera module, some particles, dust or dirt (also referred as pollutant in this specification) may be brought into the lens module or the image sensor. Under this circumstance, the image quality of the image-capturing device is deteriorated. Generally, a testing process is performed to detect whether there is any pollutant present within the close space. Once any particle, dust or dirt is detected, the lens module needs to be detached from the printed circuit board in order to remove the particle, dust or dirt. Since the lens module has been fixed on the printed circuit board, the process of detaching the lens module from the printed circuit board may easily result in damage of lens module and even cause considerable economic loss. A related discussion is described in for example Taiwanese Utility Model Patent No. 283188, entitled "Assembling structure of lens module". If there is a stain on the image sensor after the lens module has been glued on the printed circuit board, the lens module needs to be detached from the printed circuit board. This may leads to damage of the lens module and thus the lens module may fail to be used again. Under this circumstance, the manufacturing cost is increased. Therefore, there is a need of providing an improved fabricating method of the camera module.

In accordance with a second assembling method, the configurations of the camera module are similar to those made by the first assembling method. The lens module has a lens set and a lens barrel sheltering the lens set. After the camera module is assembled, the lens barrel of the lens module could be twisted out in order to perform a cleaning procedure. Although the cleaning procedure is simplified in comparison with the first assembling method, there are still some drawbacks. For example, after the cleaning procedure is completed, the lens barrel needs to be twisted in the lens holder again in order to recombine the lens barrel and the lens holder. During the lens barrel is twisted in the lens holder, particles are readily generated due to friction between the thread structures of the lens barrel and the lens holder. Once the particles fall into the internal portion of the camera module, a secondary pollution problem occurs and the image quality is also adversely affected. Under this circumstance, the yield of the camera module is still unsatisfactory.

SUMMARY OF THE INVENTION

In accordance with an aspect of the present invention, there is provided a method for fabricating a camera module. The camera module includes a lens module, an image sensor, a printed circuit board for supporting the image sensor, and a lens holder for connecting the lens module and the printed circuit board. The method for fabricating a camera module includes the following steps. Firstly, at least one cleaning hole is created in the lens holder, and the at least one cleaning hole is filled with a removable sealing stuff. Then, the printed circuit board, the image sensor, the lens holder and the lens module of the camera module are combined together. Then, a testing procedure is performed to detect whether any pollutant is present within the assembled camera module. Once any pollutant within the assembled camera module is detected, the sealing stuff is removed from the at least one cleaning hole, a cleaning procedure is done to remove the pollutant, and the at least one cleaning hole is closed again.

In an embodiment, the cleaning procedure includes a step of sucking up the pollutant through the at least one cleaning hole. The step of sucking up the pollutant through the at least one cleaning hole includes sub-steps of: inserting a tubular cleaning tool into an internal portion of the camera module through the at least one cleaning hole, and sucking up the pollutant through the at least one cleaning hole with the tubular cleaning tool. An exemplary tubular cleaning tool is a syringe needle.

In an embodiment, the cleaning procedure includes a step of blowing off the pollutant through the at least one cleaning hole. The step of blowing off the pollutant through the at least one cleaning hole includes sub-steps of: inserting a tubular cleaning tool into an internal portion of the camera module through the at least one cleaning hole, and blowing off the pollutant through the at least one cleaning hole with the tubular cleaning tool. An exemplary tubular cleaning tool is a syringe needle.

In a case that the cleaning procedure includes a step of blowing off the pollutant through the at least one cleaning hole, an inner surface of the lens holder is previously coated with a layer of viscous substance on before the camera module is assembled, wherein the pollutant that is blown off is adsorbed on the viscous substance.

In an embodiment, the cleaning procedure includes steps of: inserting a cleaning tool into an internal portion of the camera module through the at least one cleaning hole, and adsorbing the pollutant with a tip of the cleaning tool so as to remove the pollutant.

The procedure of removing the sealing stuff is variable according to the selected material of the sealing stuff. In an embodiment, the sealing stuff is removed by pulling or tearing off the sealing stuff from the at least one cleaning hole. In another embodiment, the sealing stuff is an adhesive, and the sealing stuff is removed by dissolving the adhesive with a solvent.

In accordance with another aspect of the present invention, there is provided a camera module. The camera module includes a printed circuit board, an image sensor, a lens module and a lens holder. The image sensor is mounted on the printed circuit board. By the lens holder, the lens module is fixed on the printed circuit board. The lens holder includes at least one cleaning hole in a sidewall thereof. The at least one cleaning hole is filled with a removable sealing stuff. The sealing stuff is removed from the at least one cleaning hole before a cleaning procedure is done to clean the camera module.

In an embodiment, the sealing stuff is made of a material that is detachable from the lens holder by a pulling or tearing action.

In an embodiment, the sealing stuff is soluble in a solvent.

In an embodiment, an inner surface of the lens holder is coated with a layer of viscous substance.

In an embodiment, the lens holder is substantially a sleeve with a first opening at a first end and a second opening at a second end, and the first end having the first opening is attached on the printed circuit board. An inner thread structure is formed on an inner surface of the second opening of the lens holder. An outer surface of the lens module has an outer thread structure mating with the inner thread structure, so that the lens module is permitted to be twisted in or twisted out with respect to the lens holder.

In an embodiment, the second opening is sealed by a transparent sheet-like element, so that the image sensor is accommodated within a close space defined by the printed circuit board, the lens holder and the transparent sheet-like element.

In an embodiment, the camera module includes an actuator between the lens module and the lens holder for driving the lens module to adjust the focus.

In accordance with a further aspect of the present invention, there is provided a method for cleaning a camera module. The cleaning method can be carried out during the process of assembling and testing the camera module. In a case that the camera module is returned to the depot service for repair or maintenance, the cleaning method is also feasible.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
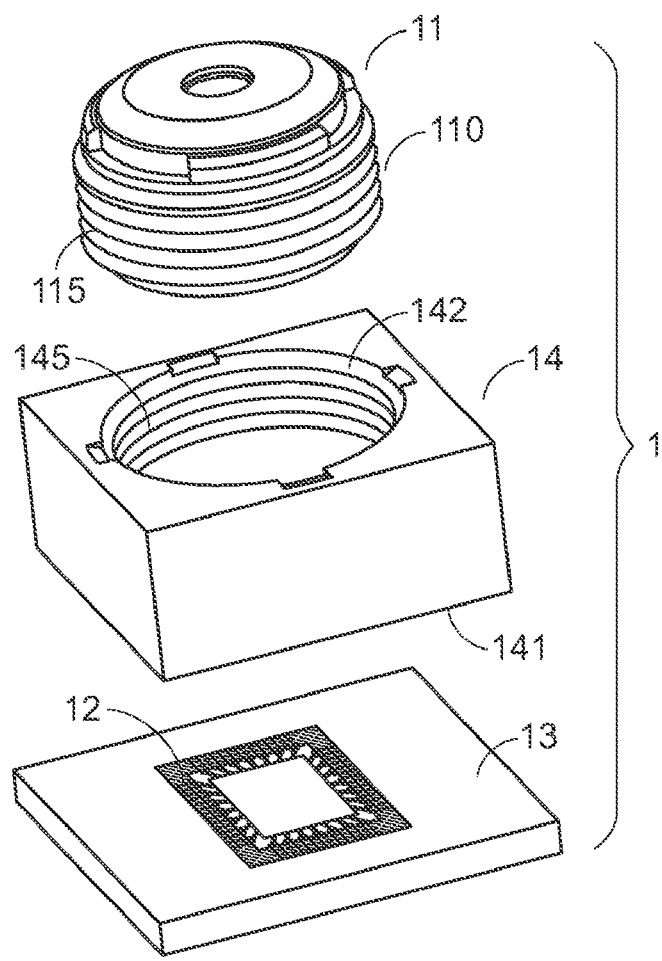
FIG. 1 is a schematic exploded view illustrating a camera module according to an embodiment of the present invention.
Figure 2:
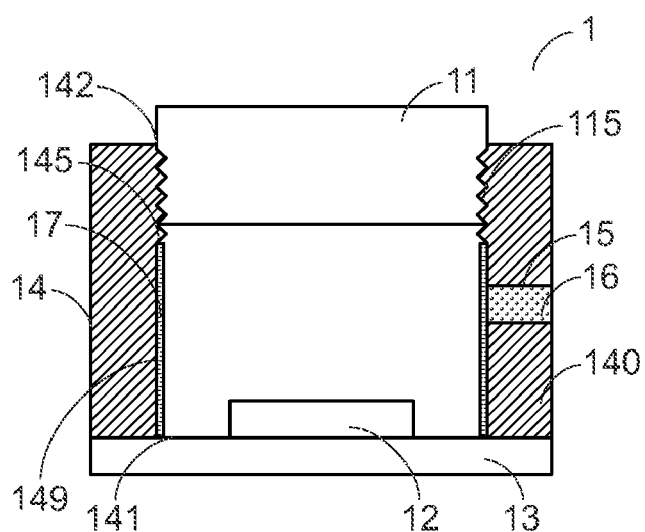
FIG. 2 is a schematic cross-sectional view illustrating the assembly of the camera module shown in FIG. 1.

FIG. 1 is a schematic exploded view illustrating a camera module according to an embodiment of the present invention. FIG. 2 is a schematic cross-sectional view illustrating the assembly of the camera module shown in FIG. 1. Please refer to FIG. 1 and FIG. 2. The camera module 1 comprises a lens module 11, an image sensor 12, a printed circuit board 13 and a lens holder 14. The image sensor 12 is mounted on the printed circuit board 13. The lens module 11 comprises a lens set (not shown) and an external lens barrel 110. The lens module 11 is fixed on the printed circuit board 13 through the lens holder 14. As such, an external light can be imaged on the image sensor 12 through the lens module 11 so as to achieve an image capturing function. The camera module 1 is applied to a portable electronic device such as a mobile phone or a personal digital assistant (PDA) or a notebook computer.

The lens holder 14 is substantially a sleeve with a first opening 141 at a first end and a second opening 142 at a second end. The first end having the first opening 141 is adhered on the printed circuit board 13. At the second end of the lens holder 14, an inner thread structure 145 formed on the inner surface of the second opening 142. The lens barrel 110 of the lens module 11 has an outer thread structure 115 formed on the outer surface thereof.

The outer thread structure 115 of the lens barrel 110 mates with the inner thread structure 145 of the lens holder 14 such that the lens module 11 can be twisted in or twisted out with respect to the lens holder 14 upon rotation of the lens module 11. Moreover, a cleaning hole 15 is formed in a sidewall 140 of the lens holder 14. The cleaning hole 15 is filled with a removable sealing stuff 16. The sealing stuff 16 is made of an adhesive or similar material that is breakable by a pulling or tearing action or soluble in a specified solvent. The procedure of removing the sealing stuff 16 is variable according to the selected material of the sealing stuff 16. The location, shape and size of the cleaning hole 15 can be varied according to the size of the camera module 1, the relative positions of respective components after being assembled, and the size and shape of the cleaning tool. If necessary, the number of the cleaning hole 15 could be increased. For reducing the possibility of causing pollution, it is preferred that the lens holder 14 has at most two cleaning holes 15.

Figure 5:
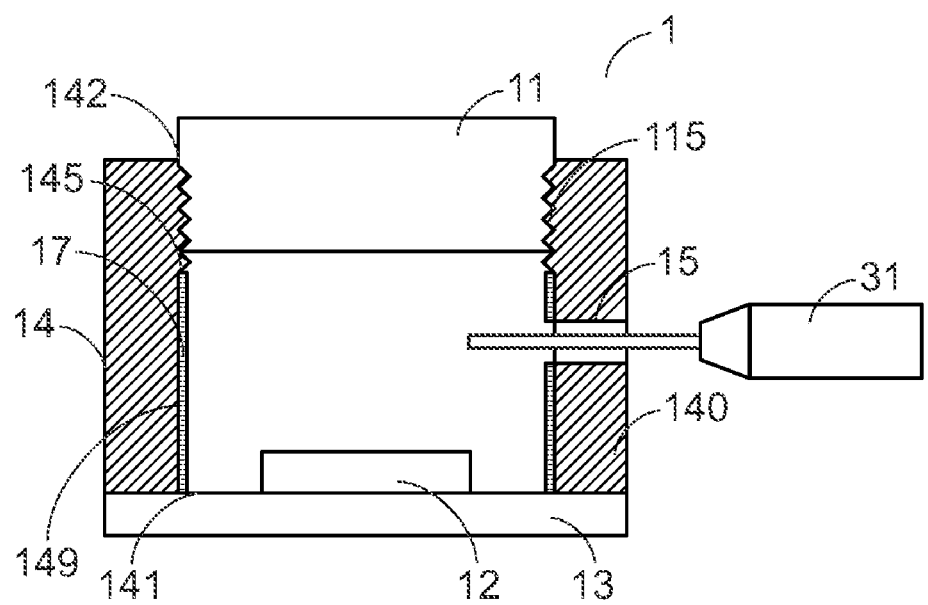
FIG. 5 is a schematic view illustrating a device for cleaning the camera module shown in FIG. 1.
Figure 7A:
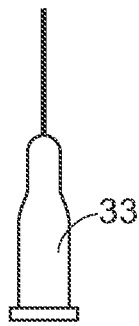
FIG. 7A is a schematic view illustrating an exemplary cleaning tool used for cleaning the camera module of the present invention.
Figure 7B:
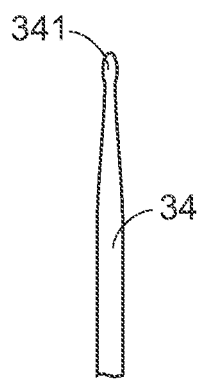
FIG. 7B is a schematic view illustrating another exemplary cleaning tool used for cleaning the camera module of the present invention.

FIG. 5 is a schematic view illustrating a device for cleaning the camera module shown in FIG. 1. For cleaning the internal portion of the camera module 1, the sealing stuff 16 needs to be removed from the cleaning hole 15. Next, a cleaning tool 31 is inserted into the internal portion of the camera module 1 for performing a cleaning procedure. After the pollutant within the internal portion of the camera module 1 is removed, the cleaning hole 15 is filled with the sealing stuff 16 again. Since it is not necessary to separate the lens module 11 from the lens holder 14 by this cleaning method, the secondary pollution problem resulted from recombination of the lens module 11 and the lens holder 14 will be avoided. For removing the pollutant included within the internal portion of the camera module 1, dry ice or compressed air may be introduced into the internal portion of the camera module 1 with the cleaning tool 31 to blow off the pollutant. Alternatively, the pollutant included within the internal portion of the camera module 1 may be vacuum sucked through the cleaning tool 31. Alternatively, the pollutant included within the internal portion of the camera module 1 may be removed by an adsorbing or absorbing means. The type of cleaning tool 31 is selected according to the desired means of removing the pollutant. For blowing off or sucking up the pollutant, a syringe needle 33 as shown in FIG. 7A is feasible as the cleaning tool 31. For directly adsorbing the pollutant, the syringe needle 33 as shown in FIG. 7A and the stick-like tool 34 as shown in FIG. 7B are feasible as the cleaning tool 31. Since the pollutant could be directly adsorbed on the tip 341 of the stick-like tool 34, the pollutant is removed after the stick-like tool 34 is ejected out of the camera module 1. For enhancing the adsorbing efficacy, the tip 341 of the stick-like tool 34 could be previously stained with an adhesive or the tip 341 of the stick-like tool 34 could be made of a highly viscous material.

Please refer to FIG. 2. As known, if the pollutant is present in the imaging region of the image sensor 12, the imaging quality of the camera module is deteriorated. During the process of blowing off the pollutant, the inner surface 149 of the lens holder 14 could be previously coated with a layer of viscous substance 17. When the pollutant is blown up by the gas introduced from the cleaning tool, the pollutant will be adherent onto the inner surface 149 of the lens holder 14 in order to preventing the pollutant from returning back the imaging region of the image sensor 12 again.

For facilitating the fabrication of the camera module 1, before the camera module 1 is assembled, the cleaning hole 15 is created in the lens holder 14, the cleaning hole 15 is filled with the sealing stuff 16, and the inner surface 149 of the lens holder 14 is coated with a layer of viscous substance 17. During the process of assembling the camera module 1, the image sensor 12 is mounted on the printed circuit board 13, then the lens holder 14 is fixed on the printed circuit board 13, and finally the lens module 11 is combined with the lens holder 14. After the camera module 1 is assembled, a testing procedure is performed to detect whether any pollutant is present within the assembled camera module 1. For performing the testing procedure, the electrical contacts (not shown) on the periphery of the image sensor 12 should be electrically connected with a display device (not shown). Via the display device, it can be observed and determined whether there is any pollutant (e.g. particle, dust or dirt) adversely influencing the image quality according to the captured image. Once any pollutant is detected, the sealing stuff 16 is removed from the cleaning hole 15, such that the cleaning procedure can be performed through the cleaning hole 15. After the cleaning procedure is completed, the cleaning hole 15 is filled with the sealing stuff 16 again, and the testing procedure is performed again. The cleaning procedure and the testing procedure could be repeatedly implemented until the tester assures that pollutant (e.g. particle, dust or dirt) adversely influencing the image quality is no longer present within the camera module 1.

Figure 3:
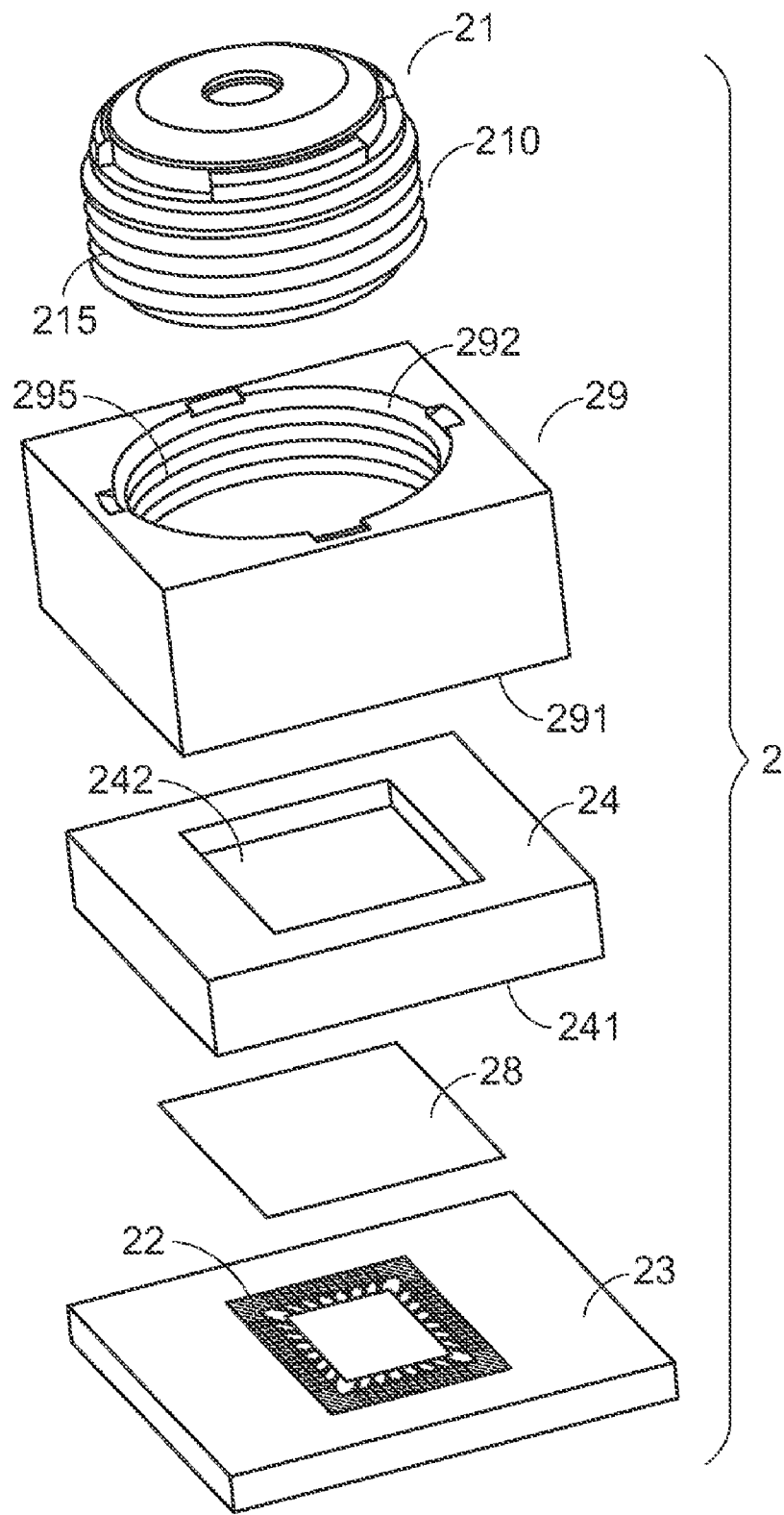
FIG. 3 is a schematic exploded view illustrating a camera module according to another embodiment of the present invention.
Figure 4:
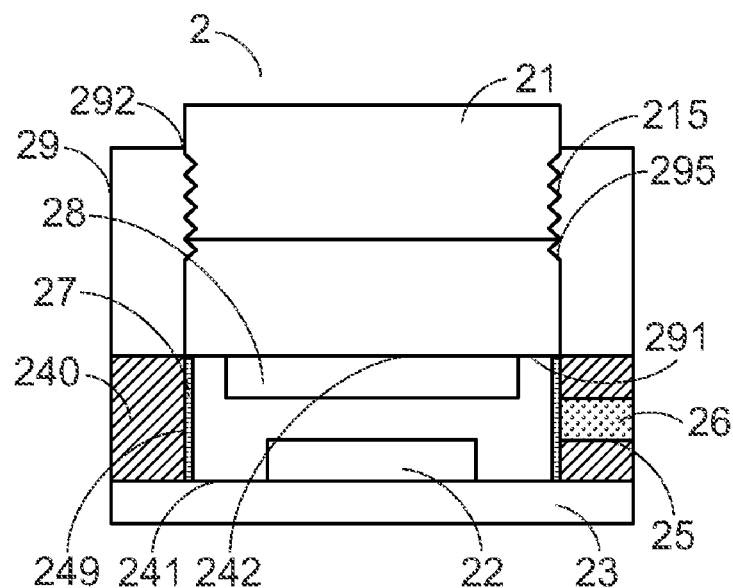
FIG. 4 is a schematic cross-sectional view illustrating the assembly of the camera module shown in FIG. 3.

FIG. 3 is a schematic exploded view illustrating a camera module according to another embodiment of the present invention. FIG. 4 is a schematic cross-sectional view illustrating the assembly of the camera module shown in FIG. 3. Please refer to FIG. 3 and FIG. 4. The camera module 2 comprises a lens module 21, an image sensor 22, a printed circuit board 23, a lens holder 24, and an actuator 29. The image sensor 22 is mounted on the printed circuit board 23. The lens holder 24 is substantially a sleeve with a first opening 241 at a first end and a second opening 242 at a second end. The first end having the first opening 241 is adhered on the printed circuit board 23. The second opening 242 is sealed by a transparent sheet-like element 28. The transparent sheet-like element 28 is simply a transparent plate for offering a protective efficacy or a light filter having a specified color-filtering efficacy (e.g. an IR light filter).

The lens holder 24 is fixed on the printed circuit board 23 and encloses the image sensor 22. As a consequence, a close space is defined by the printed circuit board 23, the lens holder 24 and the transparent sheet-like element 28. Similarly, the actuator 29 is substantially a sleeve with a first opening 291 at a first end and a second opening 292 at a second end. The first end having the first opening 291 is attached on the second end of the lens holder 24. At the second end of the actuator 29, an inner thread structure 295 formed on the inner surface of the second opening 292. The lens barrel 210 of the lens module 21 has an outer thread structure 215 formed on the outer surface thereof. The outer thread structure 215 of the lens barrel 210 mates with the inner thread structure 245 of the lens holder 24 such that the lens module 21 can be twisted in or twisted out with respect to the lens holder 24 upon rotation of the lens module 21.

The lens module 21 comprises a lens set (not shown) and the external lens barrel 210. By means of the actuator 29, the lens module 21 is driven to adjust the focus on a subject. As such, an external light can be imaged on the image sensor 22 through the lens module 21 so as to achieve an image capturing function. The camera module 2 is applied to a portable electronic device such as a mobile phone or a personal digital assistant (PDA) or a notebook computer.

Since the image sensor 22 is accommodated with the close space defined by the printed circuit board 23, the lens holder 24 and the transparent sheet-like element 28, the cleaning procedure fails to be done even if the lens module 11 is disassembled. If the conventional cleaning procedure is employed, the lens holder needs to be detached from the printed circuit board 23, which leads to damage of the actuator 29 and thus the actuator 29 fails to be used again. Since the actuator 29 is a costly component of the camera module 2, discarding the actuator 29 increases the fabricating cost of the camera module 2. According to the key feature of the present invention, a cleaning hole 25 is formed in a sidewall 240 of the lens holder 24. The cleaning hole 25 is filled with a removable sealing stuff 26. The material of the sealing stuff 26, the procedure of removing the sealing stuff 26, the selection of the cleaning hole 25 and the variants of the cleaning procedure are similar to those illustrated above, and are not redundantly described herein.

Figure 6:
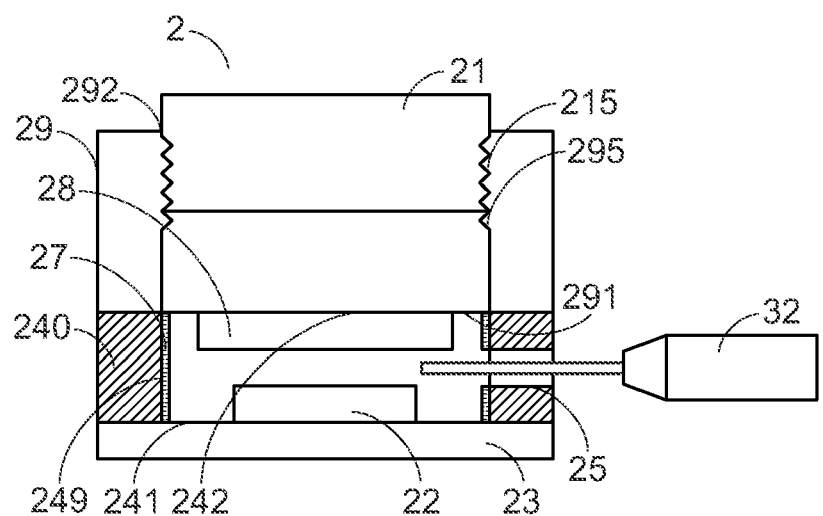
FIG. 6 is a schematic view illustrating a device for cleaning the camera module shown in FIG. 3.

FIG. 6 is a schematic view illustrating a device for cleaning the camera module shown in FIG. 3. In this embodiment, the pollutant is removed by a blowing means. Similarly, the inner surface 249 of the lens holder 24 has been previously coated with a layer of viscous substance 27. When the pollutant is blown up by the gas introduced from the cleaning tool 32, the pollutant will be adherent onto the inner surface 249 of the lens holder 24 in order to preventing the pollutant from returning back the imaging region of the image sensor 22 again.

For facilitating the fabrication of the camera module 2, before the camera module 2 is assembled, the cleaning hole 25 is created in the lens holder 24, the cleaning hole 25 is filled with the sealing stuff 26, and the inner surface 249 of the lens holder 24 is coated with a layer of viscous substance 27. During the assembling process of the camera module 2, the image sensor 22 is mounted on the printed circuit board 23, then the lens holder 24 is fixed on the printed circuit board 23, then the actuator 29 is combined with the lens holder 24, and finally the lens module 21 is combined with the lens holder 24. After the camera module 2 is assembled, a testing procedure is performed to detect whether any pollutant is present within the assembled camera module 2. For performing the testing procedure, the electrical contacts (not shown) on the periphery of the image sensor 22 should be electrically connected with a display device (not shown). Via the display device, it can be observed and determined whether there is any pollutant (e.g. particle, dust or dirt) adversely influencing the image quality according to the captured image. Once any pollutant is detected, the sealing stuff 26 is removed from the cleaning hole 25 such that the cleaning procedure can be performed through the cleaning hole 25. After the cleaning procedure is completed, the cleaning hole 25 is filled with the sealing stuff 26 again, and the testing procedure is performed again. The cleaning procedure and the testing procedure could be repeatedly implemented until the tester assures that pollutant (e.g. particle, dust or dirt) adversely influencing the image quality is no longer present within the camera module 2.

The method of cleaning the camera module according to the present invention can be carried out during the process of assembling and testing the camera module. In a case that the camera module is returned to the depot service for repair or maintenance, the cleaning method is also feasible. In addition, some mobile pollutants are not detectable by the testing procedure in the factory, but possibly fall into the imaging region if the camera module is suffered from vibration during transportation or usage. By removing the sealing stuff from the cleaning hole, cleaning the internal portion of the camera module and filling the cleaning hole with the sealing stuff again, the maintenance worker can quickly deal with such problem.

From the above description, the method of cleaning the camera module according to the present invention is very simple and time-saving. In addition, the possibility of damaging the components of the camera module is reduced. Since it is not necessary to separate the lens module from the lens holder by the cleaning method of the present invention, the secondary pollution problem resulted from recombination of the lens module and the lens holder will be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fabricating method of a camera module, said camera module comprising a lens module, an image sensor, a printed circuit board for supporting said image sensor, and a lens holder for connecting said lens module and said printed circuit board, said fabricating method comprising steps of:
    creating at least one cleaning hole in said lens holder and closing said at least one cleaning hole by a removable sealing stuff;
    combining said printed circuit board, said image sensor, said lens holder and said lens module of said camera module together; and
    performing a testing procedure to detect whether any pollutant is present within said assembled camera module, wherein once any pollutant within said assembled camera module is detected, said sealing stuff is removed from said at least one cleaning hole, a cleaning procedure is done to remove said pollutant, and said at least one cleaning hole is sealed again.

2. The fabricating method according to claim 1 wherein said cleaning procedure includes a step of sucking up said pollutant through said at least one cleaning hole.

3. The fabricating method according to claim 2 wherein said step of sucking up said pollutant through said at least one cleaning hole includes sub-steps of:
    inserting a tubular cleaning tool into an internal portion of said camera module through said at least one cleaning hole; and
    sucking up said pollutant through said at least one cleaning hole with said tubular cleaning tool.

4. The fabricating method according to claim 3 wherein said tubular cleaning tool is a syringe needle.

5. The method according to claim 1 wherein said cleaning procedure includes a step of blowing off said pollutant through said at least one cleaning hole.

6. The fabricating method according to claim 5 wherein said step of blowing off said pollutant through said at least one cleaning hole includes sub-steps of:
    inserting a tubular cleaning tool into an internal portion of said camera module through said at least one cleaning hole; and
    blowing off said pollutant through said at least one cleaning hole with said tubular cleaning tool.

7. The fabricating method according to claim 6 wherein said tubular cleaning tool is a syringe needle.

8. The fabricating method according to claim 5 further comprising a step of coating a layer of viscous substance on an inner surface of said lens holder before said camera module is assembled, wherein said pollutant that is blown off is adsorbed on said viscous substance.

9. The fabricating method according to claim 1 wherein cleaning procedure includes steps of:
    inserting a cleaning tool into an internal portion of said camera module through said at least one cleaning hole; and
    adsorbing said pollutant with a tip of said cleaning tool so as to remove said pollutant.

10. The fabricating method according to claim 1 wherein said sealing stuff is removed by pulling or tearing off said sealing stuff from said at least one cleaning hole.

11. The fabricating method according to claim 1 wherein said sealing stuff is an adhesive, and said sealing stuff is removed by dissolving said adhesive with a solvent.

12. A camera module comprising:
    a printed circuit board;
    an image sensor mounted on said printed circuit board;
    a lens module; and
    a lens holder for fixing said lens module on said printed circuit board, wherein said lens holder includes at least one cleaning hole in a sidewall thereof, said at least one cleaning hole is filled with a removable sealing stuff, and said sealing stuff is removed from said at least one cleaning hole before a cleaning procedure is done to clean said camera module.

13. The camera module according to claim 12 wherein said sealing stuff is made of a material that is detachable from said lens holder by a pulling or tearing action.

14. The camera module according to claim 12 wherein said sealing stuff is soluble in a solvent.

15. The camera module according to claim 12 wherein an inner surface of said lens holder is coated with a layer of viscous substance.

16. The camera module according to claim 12 wherein said lens holder is substantially a sleeve with a first opening at a first end and a second opening at a second end, and said first end having said first opening is attached on said printed circuit board.

17. The camera module according to claim 16 wherein an inner thread structure is formed on an inner surface of said second opening of said lens holder, and an outer surface of said lens module has an outer thread structure mating with said inner thread structure, so that said lens module is permitted to be twisted in or twisted out with respect to said lens holder.

18. The camera module according to claim 16 wherein said second opening is sealed by a transparent sheet-like element, so that said image sensor is accommodated within a close space defined by said printed circuit board, said lens holder and said transparent sheet-like element.

19. The camera module according to claim 18 further comprising an actuator between said lens module and said lens holder for driving said lens module to adjust the focus.

20. A cleaning method of a camera module, said camera module comprising a lens module, an image sensor, a printed circuit board for supporting said image sensor, and a lens holder for connecting said lens module and said printed circuit board, said lens holder having at least one cleaning hole filled with a removable sealing stuff, said method comprising steps of:
  removing said sealing stuff from said at least one cleaning hole and performing a cleaning procedure through said at least one cleaning hole; and
  sealing said at least one cleaning hole again.

21. The cleaning method according to claim 20 wherein said cleaning procedure includes a step of sucking up said pollutant through said at least one cleaning hole.

22. The cleaning method according to claim 21 wherein said step of sucking up said pollutant through said at least one cleaning hole includes sub-steps of:
  inserting a tubular cleaning tool into an internal portion of said camera module through said at least one cleaning hole; and
  sucking up said pollutant through said at least one cleaning hole with said tubular cleaning tool.

23. The cleaning method according to claim 22 wherein said tubular cleaning tool is a syringe needle.

24. The cleaning method according to claim 20 wherein said cleaning procedure includes a step of blowing off said pollutant through said at least one cleaning hole.

25. The cleaning method according to claim 24 wherein said step of blowing off said pollutant through said at least one cleaning hole includes sub-steps of:
  inserting a tubular cleaning tool into an internal portion of said camera module through said at least one cleaning hole; and
  blowing off said pollutant through said at least one cleaning hole with said tubular cleaning tool.

26. The cleaning method according to claim 25 wherein said tubular cleaning tool is a syringe needle.

27. The cleaning method according to claim 24 further comprising a step of coating a layer of viscous substance on an inner surface of said lens holder before said camera module is assembled, wherein said pollutant that is blown off is adsorbed on said viscous substance.

28. The cleaning method according to claim 20 wherein cleaning procedure includes steps of:
  inserting a cleaning tool into an internal portion of said camera module through said at least one cleaning hole; and
  adsorbing said pollutant with a tip of said cleaning tool so as to remove said pollutant.

29. The cleaning method according to claim 20 wherein said sealing stuff is removed by pulling or tearing off said sealing stuff from said at least one cleaning hole.

30. The cleaning method according to claim 20 wherein said sealing stuff is an adhesive, and said sealing stuff is removed by dissolving said adhesive with a solvent.

\* \* \* \* \*